United States Patent
Fernandez et al.

(10) Patent No.: US 7,086,681 B2
(45) Date of Patent: Aug. 8, 2006

(54) COATED SUN VISOR

(75) Inventors: Miguel Angel Fernandez, Santa Coloma de Garamet (ES); Oscar Cuadra, Torrellos de Llobregat (ES)

(73) Assignee: Fico I.T.M., S.A., Barcelona (ES)

( * ) Notice: Subject to any disclaimer, the term of this patent is extended or adjusted under 35 U.S.C. 154(b) by 0 days.

(21) Appl. No.: 10/983,143

(22) Filed: Nov. 5, 2004

(65) Prior Publication Data

US 2006/0006689 A1    Jan. 12, 2006

Related U.S. Application Data

(63) Continuation of application No. PCT/EP03/04837, filed on May 8, 2003.

(30) Foreign Application Priority Data

May 8, 2002   (DE) ................................ 102 20 580

(51) Int. Cl.
*B60J 3/00* (2006.01)
(52) U.S. Cl. .................... 296/97.12; 296/97.1
(58) Field of Classification Search .............. 296/97.1, 296/97.9, 97.12, 97.13
See application file for complete search history.

(56) References Cited

U.S. PATENT DOCUMENTS

| | | | |
|---|---|---|---|
| 5,454,616 A | | 10/1995 | Aymerich |
| 5,603,547 A | * | 2/1997 | Finn et al. .................. 296/97.1 |
| 5,823,603 A | * | 10/1998 | Crotty, III ................ 296/97.12 |
| 5,895,087 A | * | 4/1999 | Viertel et al. .............. 296/97.1 |
| 5,951,090 A | * | 9/1999 | Wilson et al. ............. 296/97.1 |
| 6,131,985 A | * | 10/2000 | Twietmeyer et al. ..... 296/97.12 |
| 6,840,561 B1 | * | 1/2005 | Mills et al. ................ 296/97.1 |
| 2005/0236865 A1 | * | 10/2005 | Torii ......................... 296/97.9 |

* cited by examiner

*Primary Examiner*—Jason Morrow
(74) *Attorney, Agent, or Firm*—Cooley Godward LLP

(57) ABSTRACT

The present invention relates to a sun visor comprising a sun visor body made of plastic; a coating of the sun visor body fixed onto the sun visor body and a spring element for mounting the sun visor in a motor vehicle. Furthermore, the present invention relates to a method for manufacture comprising the following steps: Inserting at least two plastic plates in plane opposed arrangement in a blow mold for sun visors; inserting a spring element and a pipe for gas or fluid supply between the at least two plastic plates; closing the blow mold and connecting the plastic plates via heat supply; and forming the plastic plates by the application of pressure via the pipe, connecting of the coating with the plastic plates and fixing of the spring element on the plastic plates.

14 Claims, 4 Drawing Sheets

A

B

C

D

COATED SUN VISOR

PRIORITY

The present application is a continuation of International Application No. PCT/EP03/04837 filed May 8, 2003, entitled Coated Sun Visor, which is incorporated herein by reference and which claims the benefit of German Application No. 10220580.9, filed May 8, 2002.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to a blow molded coated sun visor particularly for motor vehicles as well as a method for its manufacture.

PRIOR ART

It is known that sun visor bodies are produced by blow molding methods. In the scope of this manufacturing method, e.g. a heated tube is extruded in a blow mold, the blow mold is subsequently closed and then the extruded tube is shaped corresponding to shape specifications of the blow mold, for example, by heated air. The sun visor bodies produced by this method mostly consist of unhandsome plastic materials which have to be adapted by an outer design to the interior equipment, for example, of a motor vehicle. This design is, for example, carried out by the application of flakes or by covering by means of different materials, as, for example, clothes or plastics or foil coatings. Based on the plurality of procedure steps, these methods are time and cost intensive.

EP 0 514 616 discloses a blow molding method in which a hollow body can be both shaped and coated. It follows therefrom that the number of the above mentioned procedure steps for the outer designing can be reduced and thereby the induced production costs can be lowered. In the scope of this method, plastic plates and chosen coating materials are inserted in the blow mold, connected in their edge area by the application of heat and subsequently molded by the injection of gases or fluids. This method is, for example, qualified for producing pallets, parts of car seats or traffic signs.

For the production of the plastic lining of motor vehicles, EP-A-1 153 725 discloses a further blow molding method. The method is qualified by adding further elements to the blow molded body by means of an additional injection molding procedure without removing the body from the blow mold. However, the injection molded elements can only be mounted at the uncovered side of the lining.

A blow molding method with simultaneous outer coating is used for the manufacture of sun visors in the EP-A-0 652 099. These sun visors show an insufficient mechanical stability if the outer wall thickness is too low. The wall thickness of the sun visor body can be increased which, however, induces an increased weight of the sun visor as well as additional material costs and longer working times. The increased weight of the sun visor produced in this way also leads to an expensive fixing of the sun visor and the motor vehicle. In the construction, the known fixing element of the sun visor is not designed in such a way to withstand mechanical loading in the motor vehicle during fixing of the heavy sun visors.

Further methods for the manufacture of blow molded sun visors are disclosed in EP-A-0 525 148 and EP-A-0 562 085. To achieve a certain mechanical stability of the blow molded sun visor bodies, on the one hand reinforcing bridges 310 are punched in the sun visor body 300 (cf. FIG. 6), or on the other hand the whole sun visor body is filled with a further plastic material. A spring element 350 for later mounting of the sun visor in the motor vehicle is fixed by holding ribs 330.

The holding ribs 330 are punched in the sun visor body 300 from the outside so that they clamp the spring element 350. The holding ribs 350 are visible from the outside as recesses in the sun visor body 300. These recesses cannot be satisfyingly covered by outer coatings of the sun visor body. Thereby, the appearance of the sun visor gets worse. Additionally, they guarantee no reliable connection of the spring element since they only partly surround and clamp the spring element.

Although sun visor bodies manufactured in this way show a sufficient mechanical stability, they have an unhandsome appearance and, thus, have to be designed from the outside by further procedure steps. As already mentioned above, the application of flakes or the covering are used for the outer designing of the sun visor bodies.

It is therefore an object of the present invention to provide a sun visor and a method for its manufacture which shows an improved stability and further which can be reliably fixed in the motor vehicle Although present devices are functional, they are not sufficiently accurate or otherwise satisfactory. Accordingly, a system and method are needed to address the shortfalls of present technology and to provide other new and innovative features.

SUMMARY OF THE INVENTION

The above problem is solved by a sun visor for motor vehicles, particularly a blow molded sun visor, having a sun visor body with an outer coating for adapting the sun visor to the interior of a motor vehicle wherein the sun visor comprises at least one stabilizing bridge for a stabilized connection of the opposed inner walls of the sun visor body and a spring element mounted within the sun visor body for fixing the sun visor in the passenger compartment of the motor vehicle such that neither the position of the at least one stabilizing bridge nor the mounting of the spring element are visible from the outside.

The sun visor according to one embodiment of the invention is manufactured by means of a blow molding method in which during the molding process at the same time an outer coating is fixed onto the sun visor body. To this end, e.g. two plastic plates are molded in a blow mold corresponding to the shape of the sun visor. For the later fixing of the sun visor in the motor vehicle, a spring element is arranged between the plastic plates to connect the same with the plastic plates during blow molding. The spring element serves, for example, for receiving a holding device fixed in the motor vehicle particularly a pin on which the sun visor is then moveably mounted. Based on the mechanical loading to which the spring element is subjected by the movement of the sun visor and the vibration in the motor vehicle, the fixing of the spring element on the plastic plates should be of long-life and stable.

At the same time, the appearance of the sun visor may not be worsened by the way of mounting the spring element. The same applies for the stabilizing bridges in the sun visor body which are preferably positioned and shaped so that they are covered by further accessories as, for example, a mirror, from the outside. Thus, the position of the stabilizing bridges and the way of mounting the spring element is chosen in such a way that they are not visible from the outside.

According to a further preferred embodiment of the present invention, the spring element is mounted on an inner wall of the sun visor body by means of a profiled surface wherein the profiled surface of the spring element comprises openings, barbs, openings with barbs or hook-like structures.

The above mentioned reliable and long-life connection between the spring element and the sun visor body is particularly realized by the provision of a profiled surface of the spring element. This profiled surface partly or completely penetrates with its structure in the plastic plates during blow molding and/or the plastic penetrates the profile of the spring element.

The different structures of such a profile realize besides the connection of the metal surface with the plastic surfaces an additional positive connection by engagement of the hook-like structures in the sun visor body. Additionally, the barbs or hook-like structures contribute to the fact that the spring element engages the plastic plates and realizes in this way a long-life connection.

According to a further preferred embodiment of the invention, the spring element comprises a connecting layer for fixing the spring element in the sun visor body which is arranged between the spring element and the inner wall of the sun visor body. The connecting layer is preferably made of plastic which adheres to metal surfaces.

The stable connection between the spring element and the sun visor body is realized by a sandwich structure according to a preferred embodiment of the present invention, which is comprises the spring element, a connecting layer and the respective plastic plates of the sun visor body. The connecting layer is featured because it shows good bonding properties onto metal surfaces, and it provides stable and reliable connection to the plastic plates. The connecting layer is preferably activated by the application of heat during the blow molding method. It is, however, also conceivable that the connecting layer is made of a suitable adhesive. It is also preferred according to embodiments of the present invention that the profiled surface of the spring element is used together with the connecting layer. It follows therefrom that the advantages of both connecting means are combined in order to guarantee a stable and reliable mounting of the spring element in the sun visor body. In this case, preferably the thickness and the extension of the connecting layer can be adapted to the profiling and the size of the spring element, for example, this includes that the hook-like structures penetrate the connecting layer and further engage the plastic plates.

According to a further preferred embodiment of the invention, the sun visor bodies comprise recesses for retaining accessories particularly mirrors wherein at least a sub area of the recess connects the opposed walls of the sun visor body by stabilizing bridges to enhance the mechanical stability of the sun visor.

Preferably, the sun visors are blow molded as hollow bodies having a low wall thickness. A low weight of the sun visor results therefrom which simplifies installation of the sun visor in a motor vehicle. In this context, it is also necessary to assure the mechanical stability of the sun visor body. To this end, it is preferred that at least one sub area of the wall of the recess existing in the sun visor body extends to the opposed wall of the sun visor body. In this way, a supporting connection is generated between the opposed walls of the sun visor body which is invisibly arranged inside of the sun visor body. This supporting connection enhances the stability of the hollow body and leads to no important weight increase. Preferably, besides these walls other areas of the recess can be structured in such a way that they contribute to support the opposed walls of the sun visor body. In this context, it is taken the advantage that these structures are later covered by the accessories to be installed as, for example, a mirror. Thus, the supporting or stabilizing elements are later not visible from the outside.

According to a further preferred embodiment of the present invention, the sun visor comprises a holding bridge for a releasable fixing of the sun visor in a motor vehicle which is formed by a plastic cylinder.

According to common practice, a sun visor is mounted at two points in a motor vehicle. A first point is formed by the pivotable connection at the spring element and the second point by the holding bridge which is normally snapped into a clamp provided therefor. The connection between the holding bridge and the clamp is releasable so that the sun visor can be adjusted according to lighting conditions. Based on the frequent releasing and re-connecting of the holding bridge and the clamp, the cover or coating of the holding bridge is worn and, thus, leads to a degradation of the appearance of the sun visor. Because of this, the holding bridge is preferably made of a plastic cylinder which comprises no further covering. This plastic cylinder is suitable to survive a plurality of releasing and connecting cycles without mechanical damage. Furthermore, it is possible to adapt the plastic cylinder in color and outer structure of the surface to the appearance of the sun visor.

Further, the present invention comprises a method for manufacturing a coated sun visor particularly for motor vehicles comprising the following steps: Inserting at least two plastic plates in plane opposed arrangement in a blow mold for sun visors consisting of two blow mold halves having a projection for forming at least one stabilizing bridge, inserting at least one layer of coating material respectively between one of the plastic plates and the adjacent wall of the blow mold, and inserting of a spring element with a pipe for gas or fluid supply between the at least two plastic plates; closing the blow mold and molding the plastic plates to a sun visor body with stabilizing bridges for a stabilizing connection of the opposed inner walls of the sun visor body, wherein neither the position of the at least one stabilizing bridge nor the mounting of the spring element is visible from the outside.

Preferably, the sun visor is manufactured by a blow molding method with simultaneous outer coating by a selected material. At the same time and besides the coating, the spring element is permanently fixed in the sun visor body. Based on the configuration of the blow mold and the construction of the spring element, a stable sun visor is formed which at the same time reliably mounts a spring element in the sun visor body. The mounting of the spring element is not visible from the outside so that it does not interfere with the appearance of the sun visor and so that a further coating of this area is prevented.

According to a preferred embodiment of the present invention, the fixing of the spring element in the sun visor body is realized via a profiled surface, via an additional connecting layer, or via the cooperation of the profiled surface and the connecting layer.

In the scope of a manufacturing method according to an embodiment of the invention, the plastic plates become deformable by the application of heat. This deformability is used to realize a long-life and mechanically stable connection between the spring element and the plastic plates of the sun visor body. In this case, the profiled surface of the spring element having, for example, hook-like structures engages a respective plastic plate of the sun visor body. It is also conceivable that the connection is realized by a connecting layer wherein the connecting layer can be activated by the application of heat. It is also conceivable that the connecting layer can be hardened by the application of heat to realize a stable connection between the spring element and the sun visor body. Preferably, the profiled surface of the spring element and the connecting layer are combined.

According to another preferred embodiment of the invention, at least one recess for receiving accessories is formed in at least one of the plastic plates. In this context, it is preferred to form a connect stabilizing bridge between the opposed walls of the sun visor body within the recess to enhance the mechanical stability of the sun visor.

According to a further preferred embodiment of the invention, a holding bridge for releasably fixing the sun visor in a motor vehicle is inserted in the sun visor which is formed by a plastic cylinder.

According to a further preferred embodiment of the present invention, the method comprises a further step of injection molding at least one element of the sun visor. The injection molding is preferably executed during the blow molding.

It is further preferred, to add further elements to the sun visor by an injection molding method. Based on this inventive combination, the different advantages of both manufacturing methods can be used to optimally configure the sun visor. The efficiency of the method is furthermore supported by the fact that the blow molding and injection molding are preferably executed at the same time. A shortening of the manufacturing time of the sun visor results therefrom.

According to a further preferred embodiment of the present invention, the injection molding is executed via heated channels whereby undesired material scrap or sprue is prevented at the molded sun visor.

The injection molding material is preferably supplied via heated channels within the blow mold. Also after completing the manufacturing process, these channels are heated so that the material contained therein does not cure. The subsequent manufacturing cycle can thus use the material contained in these channels. It is furthermore prevented by this heating that material scrap or sprue remains at the sun visor. In this manner, material is saved and an expensive finishing of the sun visor is shortened or prevented.

BRIEF DESCRIPTION OF THE DRAWINGS

The preferred embodiments of the present invention are described referring to the drawing. The following drawings show.

DETAILED DESCRIPTION

The present invention relates to a method for manufacturing coated sun visors and to coated sun visors manufactured by this method. By referring to FIG. 4, first of all the method of manufacture is described.

Figure 3:
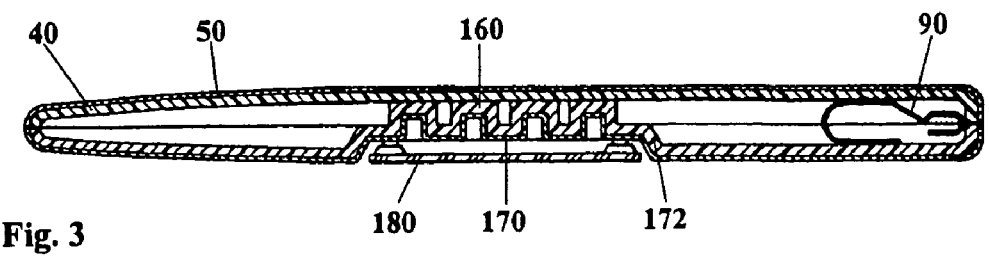
FIG. 3 a sectional view of the sun visor along the line III—III from FIG. 1.
Figure 4:
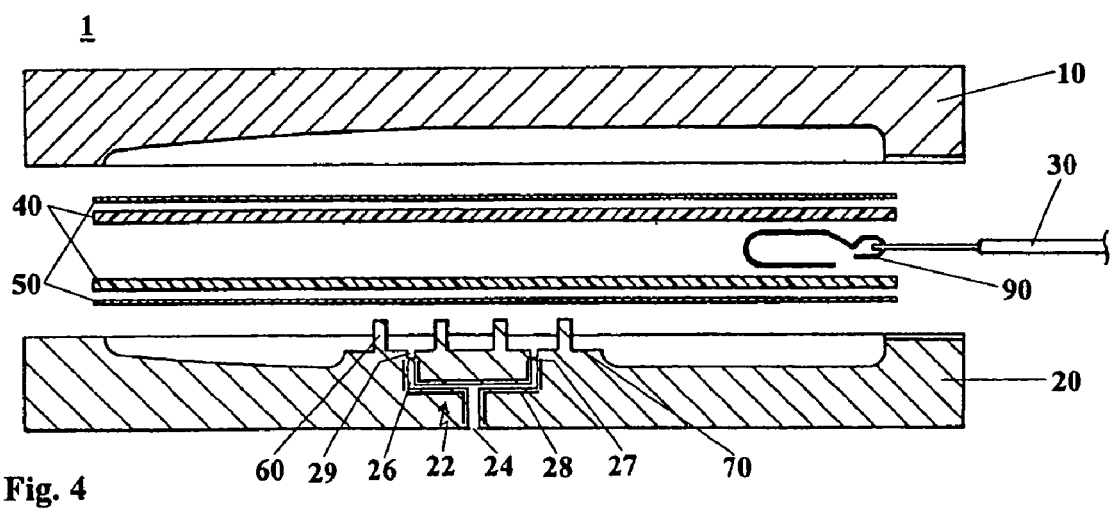
FIG. 4 an open blow mold according to a preferred embodiment of the present invention comprising two halves with inserted material to be processed and an arrangement for injection molding.

The blow mold 1 shown in FIG. 4 has two opposed blow mold halves 10, 20. These blow mold halves 10, 20 define the shape of the sun visor 100 by their inner structure. Further, the blow mold halves 10, 20 contain certain shape specifications for the later fixing of accessories in the coated sun visor 100. For example, recesses 170 can be incorporated in the sun visor 100 which can later receive mirrors 180 or lamp arrangements (cf. FIG. 3). The forming of such a recess 170 is executed, for example, in the blow mold halve 20 by the profiling 70. The profiling 70 preferably forms mounting elements in the sun visor body for retaining of accessories. For example, snapping connections are such mounting elements which can latch a corresponding accessory part in the sun visor 100.

Furthermore, the blow mold halve 20 comprises projections 60 for forming stabilizing bridges 160 in the sun visor 100 in the forming area 70 for the recess and the fixing of the accessory in the sun visor 100. These projections 60 are preferably arranged along the walls 172 to be formed of the recess 170 which runs in the direction of the opposed wall of the sun visor 100. It is also preferred to arrange the projections 60 within the profiling 70 for the recess 170. The projections 60 form stabilizing bridges 160 during the manufacturing process for sun visors 100. These stabilizing bridges 160 connect the opposed walls of the sun visor 100 and contribute to a stabilization of the hollow body having low wall thicknesses. In this way, it is guaranteed that, despite low wall thickness and despite of low weight of the hollow body, a high stiffness and stability of the sun visor 100 is realized. Because of this, the sun visor 100 is not bent or twisted during installation and use, whereby a reliable fixing in the motor vehicle is guaranteed and the accessories 180 have only to be mounted with limited technical efforts. By arranging the projections 60 to form stabilizing bridges 160, it is further guaranteed that the stabilizing bridges 160 are not visible from the outside. The stabilizing bridges 160 are covered by the installation of accessories 180 in the sun visor 100 whereby they have no negative effect on the appearance of the sun visor 100.

According to a further preferred embodiment of the invention, the blow mold 1 comprises an injection molding system 22. The injection molding system 22 serves for molding further elements of the sun visor during the blow molding process or after completing the blow molding process. During the execution of both methods, the sun visor to be manufactured remains in the blow mold 1 whereby procedure steps can be saved, and whereby the complete manufacturing time of the sun visor can be shortened. Preferably, retaining elements for accessories 180 are produced by means of the injection molding method within the recess 170 wherein this method can be also used to add further constructive or other elements. In a further embodiment of the present invention, the injection molding method can be used for designing or fashioning the sun visor.

During the injection molding process, material is preferably supplied to the sun visor to be manufactured via the material supply 24 and separate channels 26 or another channel system. The material supply 24 is preferably connected to an extruder (not shown) which prepares the material for processing. Other known material processing steps can, however, also be executed before supplying the material to the injection molding process.

The injection molding system 22 comprises different channels 26 which can preferably vary in cross-section, course and branching. The channels 26 run into a pre-form 29 at the inner wall of the blow mold half 20 via an injection molding nozzle. The pre-form 29 determines the shape and the position of the element to be injection molded. Dependent on the shape and the number of elements to be injection molded, the pre-forms 29 can be arbitrarily arranged in the blow mold 1.

Preferably, the channels 26 of the injection molding system 22 are heated by means of heating elements 28. This heating is achieved, for example, by a resistor or other systems known for heat generation. The heat supply guarantees that the material in the channels 26 does also not cure after finishing the injection molding process. The manufactured sun visor 100 and, thus, also the material in the pre-form 29 cure completely. In this manner, it is at least partly or completely prevented that material scrap or sprue is formed at the injection molded elements which has to be removed by later expensive finishing procedure steps.

The material scrap or sprue is also minimized by supplying the material via small openings in the injection molding nozzles 27 into the pre-form 29. The possibly existing material scrap or sprue has thereby only a small cross-section and it can be easily removed. A further positive effect of this procedure is an effective material exploitation or a material saving and time saving compared to conventional methods.

Preferably, the injection molded elements are made of polypropylene or polypropylene containing 20% glass powder. It is also preferred to use all materials applied for injection molding as far as they meet the requirements of the sun visor. The elements to be injection molded are formed on all arbitrary material layers of the sun visor 100 to be manufactured, and they are fastened by the injection molded process. It is further preferred to omit the outer layer beneath the elements to be injection molded in order to support the fixing of the same. Thereby, a welding for fixing used in conventional procedures is saved also more effectively organizing the manufacturing process.

The blow mold 1 for sun visors 100 has been described according to a preferred embodiment for manufacture sun visors 100. In this context, it is also conceivable that a plurality of sun visors 100 can be manufactured by a corresponding blow mold at the same time.

Within the scope of a preferable method for manufacturing the sun visor 100, the materials to be processed in shape of plates, layers or sheets are inserted between the blow mold halves 10, 20 before closing the blow mold halves 10, 20. First of all, at least two plastic plates 40 are preferably inserted into the blow mold 1. The plastic plates 40 consist preferably of thermoplastic materials, as for example, polypropylene or other thermoplastic deformable plastics. In this context, it is also possible to process recycled plastics. Although only two plastic plates 40 are shown in FIG. 4, sandwiched structures also can be inserted instead of the plastic plates 40. These sandwich structures can consist of multiple plastic layers and different plastic materials. They serve, for example, to achieve certain mechanical and optical properties of the sun visor 100.

Further, a layer of the outer coating 50 of the sun visor 100 is inserted in the blow mold 1 between the blow mold halve 10, 20 and the plastic plate 40. This outer coating 50 preferably consists of clothes, leather, plastics, foils or other materials which are suitable for the outer designing and for the adaptation of the sun visor 100 to the interior of the motor vehicle.

Before starting the forming of the sun visor 100 in the blow mold 1, fixing elements are preferably positioned between the plastic plates 40. These fixing elements serve for later fixing the sun visor 100 in the motor vehicle. The fixing elements comprise, for example, a holding bridge 80 and a spring element 90. The spring element 90 preferably has a U-shaped or a double U-shaped configuration that serves also for receiving the pipe 30 during the manufacturing process. According to a further preferred embodiment of the invention, the spring element 90 has a closed shape compared to the open U-shaped shape. This shape can be 4-squared, oval, elliptical or the like. By this closed shape, the stability of the spring element 90 is increased and the mounting of the sun visor in the motor vehicle is further supported thereby. The holding bridge 80 is preferably a plastic cylinder which serves for a releasable connection of the sun visor 100 in a clamp in the motor vehicle.

After inserting the different material layers 40, 50 and the fixing elements 80, 90, the plastic plates 40 are plastified by heat supply. The heat is, for example, supplied via the pipe 30 in the form of warm air in a temperature range of 150–180° C. Preferably, the pipe 30 is arranged between the opposed plastic plates 40 in order to prevent the adherence of the plastic plates 40 at each other by injecting the warm air. For the supply of heat it is also conceivable to inject other gases or heated fluids via the pipe 30 for rinsing the blow mold. According to a further preferred embodiment, the above mentioned material layers 40, 50 are at first heated or plastified in a furnace and subsequently positioned in the blow mold 1. Besides the furnace, conventional heating elements or irradiation can be used for this plastifying process. After positioning of the material layers 40, 50 in the blow mold 1, the blow molding is executed via the pipe 30. According to a preferred embodiment of the invention, cold air is supplied via the pipe 30. In this manner, a cooling of the molded body is simultaneously realized with the blow molding leading to a shortening of the manufacturing cycle.

The blow mold halves 10, 20 are still moved to each other in order to close in this way the blow mold 1 while supplying heat via the pipe 30. By closing the blow mold 1, the plastic plates 40 are compressed in their edge area, i.e., in the area where no hollow space exists, and they are thereby connected. The connection is supported by the plastified plastic plates which subsequently occur.

After closing the blow mold 1, the plastic plates 40 are preferably according to the invention blow molded. The blow molding is preferably executed by injection of compressed air via the pipe 30 in the blow mold 1. It is also conceivable that other compressed gases or fluids are used for blow molding the sun visor 100. Based on the supply of the compressed air via the pipe 30, the plastic plates 40 and the outer coating 50 are pressed against the inner walls of the blow mold halves 10, 20. Thus, they take on the forms defined by the blow mold 1. In this context, it is important to mention that the height of the projections 60 for the stabilizing bridges 160 should be adapted to the wall thickness of the sun visor 100 or of the plastic plates 40. That means the opposed walls of the later sun visor 100 or the plastic plates 40 in the blow mold 1 should contact each other during the blow molding process in order to produce a connecting and stabilizing connection between the opposed walls or between the plastic plates 40 of the sun visor 100. The projections 60 of the stabilizing bridges, thus, have to be adapted to the thickness of the plastic plates 40 or the thickness of the walls of the sun visor 100. After completing the molding, the plastic plates 40 form the walls of the sun visor 100 which together are also described as the sun visor body.

The projections 60 for forming the stabilizing bridges 160 preferably can comprise different shapes as long as they are sufficient to stabilizing and supportingly connect the opposed walls of the sun visor 100. For example, these shapes can be angular, cylindrical, cone shaped or tapered in other ways. Based on the tapered shape of the projections 60, the distortion of the outer coating is reduced during the blow molding of the sun visor 100. In this way, it is, for example, prevented that folds are generated in the outer coating 50 which negatively influences the appearance of the sun visor 100.

Preferably, the plastic plates 40 are pressed against the inner walls of the blow mold halves 10, 20 via the outer coating 50 during the blow molding process. By this process, the plastic plates 40 and the outer coating 50 are connected so that during subsequent hardening a coated sun visor 100 is generated. Furthermore, the plastic plates 40 preferably connect to the holding bridge 80 and the spring element 90 during the blow molding process. A connection between the spring element 90 and the plastic plates 40 is preferably realized either by profiled surface 96 of the spring element 90 or by providing a connecting layer 98 between the spring element 90 and the plastic plates 40 (cf. FIG. 5). According to a further preferred embodiment of the invention, the profiled surface 96 of the spring element 90 can be used in combination with a connecting layer 98. This connection is later addressed in detail.

After forming the sun visor 100 in the blow mold 1, the pipe 30 fixed in the spring element 90 is removed. Subsequently, the blow mold 1 is opened so that the formed sun visor 100 can be removed therefrom. Preferably, finishing steps are carried out on the sun visor 100. These finishing steps comprise, for example, removing of projecting plastic and coating residue in the edge area of the sun visor 100. Furthermore, these finishing steps preferably comprise the installation of accessories 180 in the sun visor 100. Further, it is conceivable that the sun visor 100 is, for example, designed in color or impregnated from the outside.

Figure 1:
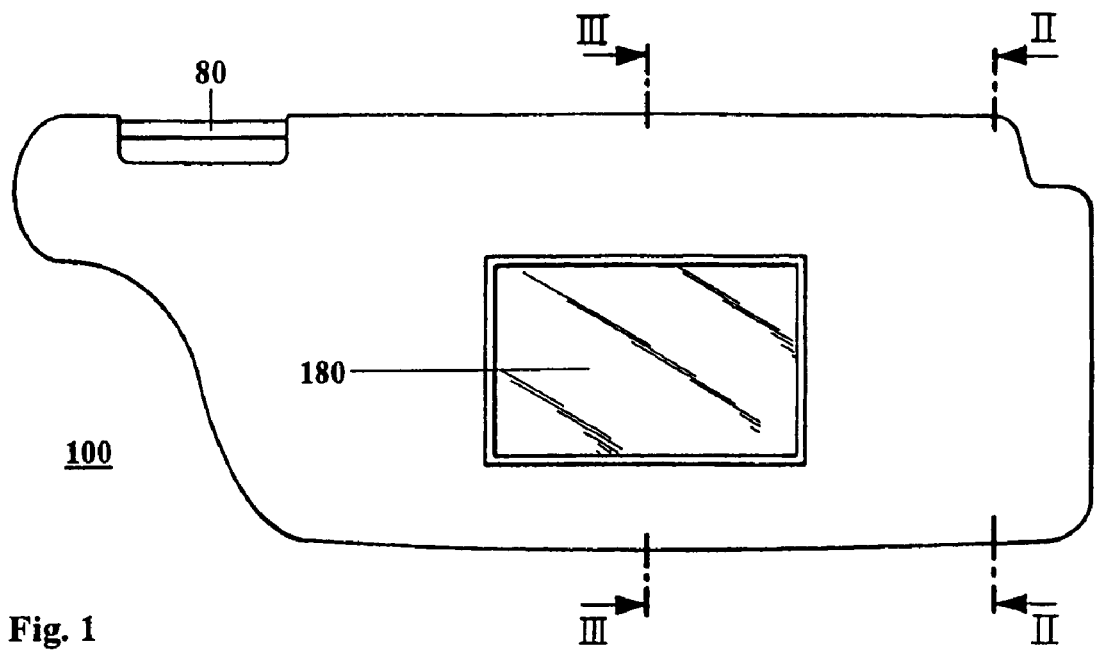
FIG. 1 a general view of a preferred embodiment of the sun visor with mirror according to the invention wherein two cutting lines are shown along the line II—II and III—III.

FIG. 1 shows a general view of the sun visor 100 according to a preferred embodiment of the invention which was manufactured by the above described blow molding method in the blow mold 1. On one side of the sun visor 100 a mirror is installed as accessory 180. Furthermore, the sun visor 100 comprises a holding bridge 80 which serves for mounting of the sun visor 100 in the passenger compartment of the motor vehicle adjacent the below described spring element 90. The sun visor 100 comprises a stable sun visor body as well as reliable mounting means as, for example, the spring element 90. The fixing of the spring element 90 is not visible from the outside and, thus, does not disturb the appearance of the sun visor.

FIG. 3 shows a cut through the sun visor 100 along the line III—III of FIG. 1. The sun visor 100 comprises an outer coating 50 and plastic walls 40. Additionally, a recess 170 for receiving accessories 180 is formed. In the area of the recess 170, stabilizing bridges 160 are arranged inside of the sun visor 100 which connect the opposed plastic walls 40 of the sun visor 100 to each other in a stabilizing way. The stabilizing bridges 160 are preferably arranged in the edge area of the recess 170 or in the inside of the recess 170. In this context, the walls 172 of the recess 170 are defined by the edge area of the recess 170 which run in the direction of the opposed wall of the sun visor 100. Additionally, the sun visor 100 comprises the fixed spring element 90 and the fixed holding bridge 80.

Figure 5:
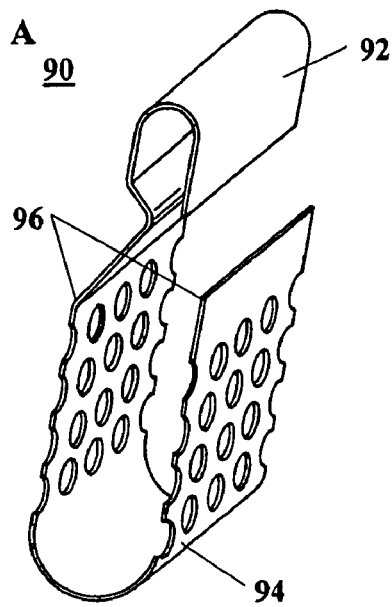
FIG. 5 A–D different embodiments of the spring element having a profiled surface or a connecting layer.
Figure 5:
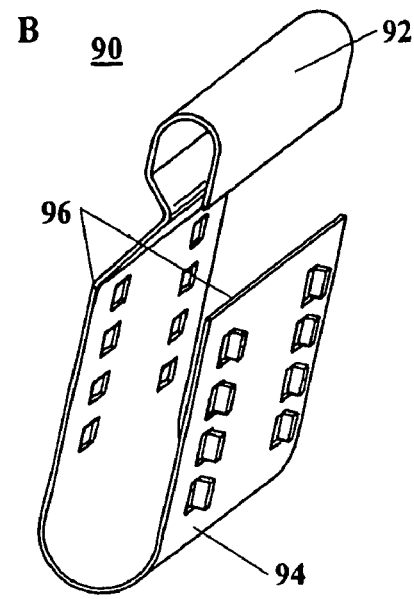
Figure 5:
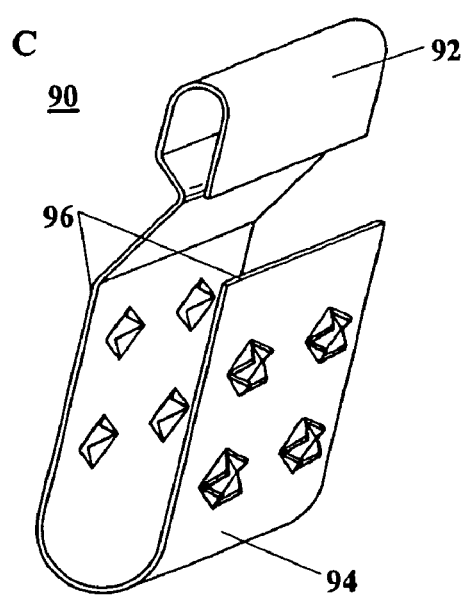
Figure 5:
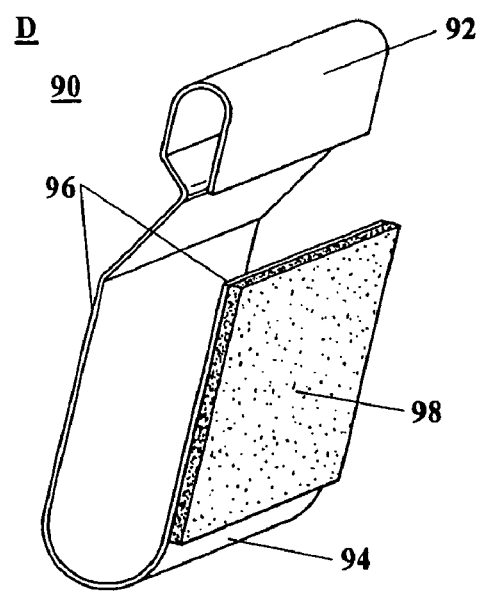
Figure 6:
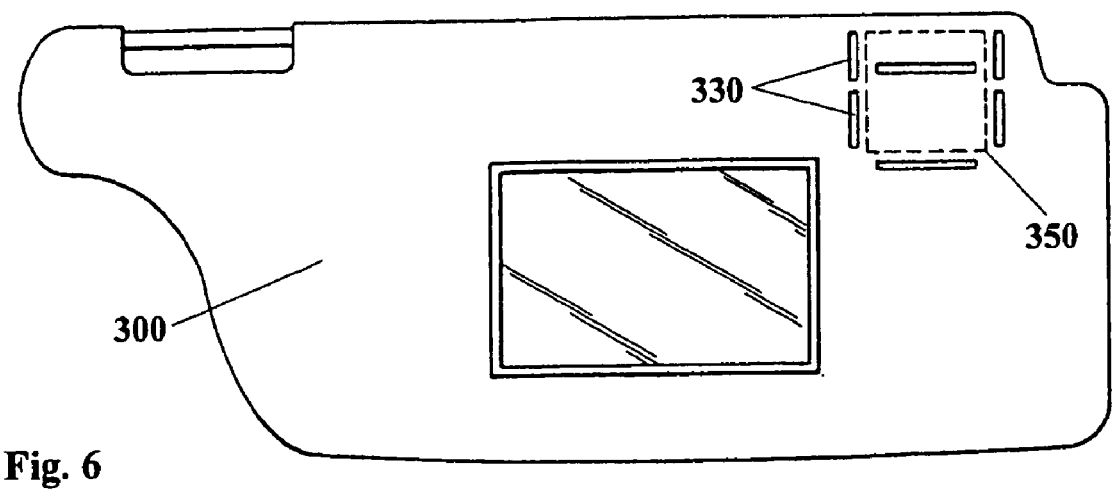
FIG. 6 a sun visor with punched holding ribs for a spring element according to the prior art.

By referring to FIG. 5 and the different embodiments of the spring element 90 depicted there in the sub illustrations A, B, C, D, the fixing and the construction of the spring element 90 is described. The spring element 90 preferably comprises an upper part 92 and a lower part 94. The upper part 92 of the spring element 90 serves for the later mounting of the sun visor 100 in the motor vehicle. To this end, it receives, for example, a pin which is mounted in the interior of the motor vehicle and guarantees in this way a pivotable mounting of the sun visor 100 in the motor vehicle.

The lower part 94 of the spring element 90 serves for the mounting of the spring element 90 in the sun visor 100 and particularly onto the plastic plates 40. Because of this reason, the lower part 94 is configured as a large surface compared to the upper part 92 of the spring element 90. The opposed plates 96 of the lower part 94 of the spring element 90 form a rigid connection with the plastic plates 40 and, thus, with the walls 40 of the sun visor 100 during the manufacture of the sun visor 100 by blow molding in the blow mold 1. This connection is preferably supported by the configuration of the opposed plates 96 of the lower part 94. The opposed plates 96 of the lower part 94 of the spring element 90 preferably comprise different profiles which are shown in FIGS. 5a, 5b and 5c. These profiles comprise different sharp-edged openings, hook-like structures, barbs, different indention shapes (not shown) and spike-like projections (not shown). The above mentioned profiles are respectively directed to the walls 40 of the sun visor 100 in order to be mounted therein. In this connecting process between the spring element 90 and the walls 40 of the sun visor 100, also a positive connection between the sun visor wall 40 and the opposed planes 96 of the spring element 90 is formed besides other ways of connections. Even the shape of the inventive profiles guarantees that the spring element 90 is fixed permanently and reliably in the sun visor 100. In this way, the mechanical loads generated by the use of the sun visor and received by the spring element 90 do not lead to a loosening of the spring element 90 and, thus, to a fast failure of the fixing of the sun visor 100 in the motor vehicle.

According to a further preferred embodiment of the invention, the profiled surfaces 96 are realized by an additional element (not shown). This element is made, for example, of a profiled metal or plastic plate which has a similar size as the lower part 94 of the spring element 90. In view of the size of the element, it is also conceivable that it is made smaller than the lower part 94 as long a sufficient mounting is realized thereby. Further, it can also be bigger in size than the lower part 94. In this case, plane elements are conceivable, or the elements have finger-like or elongated structures which along the walls of the sun visor abut or engage the walls. Preferably, the element is mounted on the sides of the lower part 94 which face the inner walls of the sun visor body. For mounting, all conceivable mechanical and chemical fixing means can be used as, for example, adhesive, rivets, screws, clamps.

A further fixing of the spring element 90 is shown in FIG. 5D. Preferably, the opposed planes 96 are coated by a connecting layer 98 in this spring element 90. This connecting layer 98 has the property to provide a rigid connection with metal surfaces and to realize a rigid connection with plastic surfaces. In this way, it is guaranteed that a reliable and stable connection between the spring element 90 and the sun visor 100 is realized. This connecting layer 98 can be comprised, for example, of specially adapted adhesives or other plastics which show the above mentioned properties. The connecting properties of the connecting layer 98 can be, for example, activated by the influence of heat or the later cooling. It is also conceivable to use a connecting layer 98 which forms rigid connection after expiration of a certain hardening time.

A combination of the profiled surfaces of the opposed planes 96 of the spring element 90 and the connecting layer 98 can also preferably be used to fix the spring element 90 in the sun visor 100. In this case, the profiles are configured in such a way that they penetrate the connecting layer 98 in order to form in this way a positive connection with both the connecting layer 98 and the wall 40 of the sun visor 100.

Figure 2:
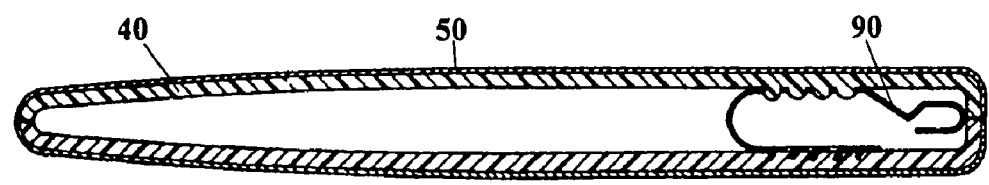
FIG. 2 a sectional view of the sun visor along the line II—II from FIG. 1.

FIG. 2 shows a sectional illustration of the sun visor 100 along the line II—II of FIG. 1. In this illustration, the single elements of the sun visor 100 as well as the position and the mounting of the spring element 90 are shown. The sun visor 100 comprises an outer coating 50, the plastic walls 40 forming the sun visor body and the spring element 90 for mounting the sun visor 100 in the motor vehicle. The below U-shaped portion of the spring element 90 is shown according to a preferred embodiment of the invention with a profiled surface (left) and with openings in the surface (right). One sees on the left side of the U-shaped portion of the spring element 90 that the plastic plate 40 or the sun visor body engages the openings of the spring element 90. On the right hand side, the profiled surface of the spring element 90 engages the sun visor body. Thereby, the spring element 90 is permanently and reliably mounted in the sun visor body in two different ways. At the same time, the mounting is not visible from the outside although the sun visor body also forms a positive connection with the U-shaped portion of the spring element 90.

LIST OF REFERENCE SIGNS

1 Blow mold
10, 20 Blow mold halves
22 Injection molding system
24 Material supply
26 Channel
27 Injection molding nozzle
28 Heating element
29 Preform
30 Pipe
40 Plastic plates
50 Outer coating
60 Projections for stabilizing bridges
70 Profile for the recess
80 Holding bridge
90, 350 Spring element
92 Upper part of the spring element 90
94 Lower part of the spring element 90
96 Opposed planes of the lower part 94 of the spring element 90
98 Connecting layer
100 Coated sun visor
160 Stabilizing bridge
170 Recess
172 Wall of the recess
180 Accessories
300 Sun visor body
330 Holding ribs

What is claimed is:

1. A sun visor for motor vehicles, having a sun visor body with outer coating for adapting the sun visor to an interior of the motor vehicle, comprising:
   a. at least one stabilizing bridge for a stabilized connection of opposed inner walls of the sun visor body; and
   b. a spring element mounted in an interior of the sun visor body for fixing the sun visor in the interior of the motor vehicle wherein
   c. neither the position of the at least one stabilizing bridge nor the mounting of the spring element are visible from the outside, characterized in that
   d. the sun visor further comprises a connecting layer for mounting the spring element in the sun visor body which is arranged between the spring element and an inner wall of the sun visor body, wherein
   e. the connecting layer is made of plastic material which adheres to metal surfaces.

2. The sun visor according to claim 1, wherein the spring element is mounted by a profiled surface on an inner wall of the sun visor body.

3. The sun visor according to claim 2, wherein the profiled surface of the spring element comprises a structure selected from a group consisting of openings, barbs, openings with barbs and hook-shaped structures.

4. The sun visor according to claim 1, wherein the sun visor body comprises a recess for receiving accessories.

5. The sun visor according to claim 4, wherein at least one sub area of the recess connects the opposed walls of the sun visor body by stabilizing bridges to enhance the mechanical stability of the sun visor.

6. The sun visor according to claim 1, wherein the sun visor comprises a holding bridge for releasably mounting the sun visor in a motor vehicle which consists of a plastic cylinder.

7. A method for manufacturing a coated sun visor, particularly for motor vehicles, comprising:
   a. inserting at least two plastic plates in plane opposed arrangement in a blow mold for sun visors having two blow mold halves with a projection for forming at least one stabilizing bridge, inserting at least one layer of a coating material respectively between one of the plastic plates and the adjacent wall of the blow mold and inserting a spring element with a piper for supplying gas or fluids between the at least two plastic plates;
   b. closing the blow mold and molding the plastic plates to a sun visor body having stabilizing bridges for a stabilizing connection of opposed inner walls of the sun visor body wherein
   c. neither the position of the at least one stabilizing bridge nor the mounting of the spring element are visible from the outside.

8. A method for manufacture of a coated sun visor according to claim 7 wherein the spring element is fixed to the plastic plates via fixation means selected from the group consisting of: a profiled surface, via an additional connecting layer, and via the cooperation of the profiled surface and the connecting layer.

9. The method for the manufacture of coated sun visors according to claim 7 further comprising the forming of at least one recess for receiving accessories in at least one of the plastic plates.

10. The method for the manufacture of coated sun visors according to claim 9 wherein the connecting stabilizing bridges between the opposed walls of the sun visor body are formed within the recess to increase the mechanical stability of the sun visor.

11. The method for the manufacture of coated sun visors according to claim 8 wherein a holding bridge for releasably mounting the sun visor in a motor vehicle is installed in the sun visor.

12. The method for the manufacture of coated sun visors according to claim 7 further comprising the step of
    injection molding at least one element of the sun visor.

13. The method for the manufacture of coated sun visors according to claim 12 wherein the injection molding is executed during the blow molding.

14. The method for the manufacture of coated sun visors according to claim 13 wherein the injection molding is executed via heated channels whereby undesired material scrap or sprue is prevented at the molded sun visor.

* * * * *